2,706,191

AMINO AND AMIDO ESTER POLYMERS AND METHOD OF MAKING

Reynold E. Holmen, White Bear Township, Ramsey County, Minn., assignor to Minnesota Mining & Manufacturing Company, St. Paul, Minn., a corporation of Delaware No Drawing. Application June 19, 1952,
Serial No. 294,470

3 Claims. (Cl. 260—67)

This invention relates to synthetic polymeric or resinous bodies containing both ester linkages and amino or amido linkages, to methods of making such polymers, and to products formed therefrom, or treated or impregnated therewith. One particular aspect of the invention is concerned with nitrogen-containing polyester polymers which are soluble in readily available volatile organic solvents and form concentrated solutions of low viscosity suitable for impregnation of paper or the like, and which can then be readily cured to an insoluble, tough and flexible state to provide unified fibrous sheet material suitable as delamination-resistant flexible solvent-resistant backings for pressure-sensitive masking tape.

In accordance with the principles of the invention here described, I am enabled to provide low-molecular-weight polymers containing both ester and amino or amido linkages, which are soluble in low-cost solvents and solvent mixtures such as xylol-isopropanol mixtures, and which can be further readily reacted or cured to a high molecular weight, rubbery or leathery state by heating with very minor proportions of aldehydes or other aldehydic curing agents. These polymers may be produced from relatively readily available, low cost raw materials by single-step methods, and hence at a commercially attractive price. They may be further reacted with a variety of reactants to provide reaction products suitable for a wide variety of applications. These soluble curable polymers have found application as impregnants for unifying porous paper in the production of strong, tough, flexible, oil-resistant sheet material suitable for application as gaskets, backings for water-resistant and oil-resistant abrasive-coated sheet materials, etc., and particularly in the production of flexible unified backings for lacquer-resistant pressure-sensitive masking tape, high dielectric strength pressure-sensitive electrical tape, and other pressure-sensitive adhesive tapes.

Others have previously produced nitrogen-containing ester-type polymers, but which differed in one or more significant respects from the novel polymers of the present invention. In particular, other workers of whom I am aware have produced high molecular weight amide-ester polymers which could be further reacted or cured by heating in the presence of small amounts of peroxide-type catalysts. Such polymers necessarily contain activated olefinic unsaturation, which in many cases requires the use of a multiple-step process in preparing the polymer. On the contrary, my polymers need not contain activated olefinic linkages; they are preferably made by a single-step process in which all ingredients are simultaneously heated together; and they do not polymerize or cure under the influence of customary small amounts, e. g. 1–5%, of peroxide-type catalysts.

On the other hand, I have found that my soluble polymers cure rapidly to insoluble rubbery or leathery products when heated with a small proportion of an aldehyde such as formaldehyde or with an aldehyde-derived source of active methylol groups such as a soluble heat-reactive amino-aldehyde or phenol-aldehyde resin. Depending on the particular source of aldehyde or equivalent groups, the particular proportions employed, the reaction conditions, and other significant variables, I am enabled to further react or cure my soluble polymeric materials to more or less insoluble, rubbery, tough and flexible, adherent end products having utility in a wide variety of applications. These cured polymers offer numerous advantages over previously available polymeric materials for many purposes. They contain no sulfur, hence are non-corrosive to copper. They are more flexible at low temperatures, and are more rubbery at all temperatures, than ester-type alkyd resins previously available.

Specific examples of my novel compositions and procedures will now be set forth in an endeavor more clearly to describe the principles of the invention, but without any intent of limitation. In these examples, the amounts of reactants are expressed mainly in molar proportions.

Example 1

| | | |
|---|---|---|
| Phenyldiethanolamine | 6 mols, | 1090 parts by weight |
| Dimerized fatty acids | 1.5 mols, | 910 parts by weight |
| Diglycolic acid | 3.96 mols, | 538 parts by weight |
| Maleic anhydride | .54 mols, | 53 parts by weight |

The dimerized fatty acids may be prepared by polymerization of the fatty acids of drying or semi-drying oils, e. g. linseed, soybean, or cottonseed oil, by any of a number of well-known methods; see, for example, the article by C. G. Goebel entitled "Polymerization of unsaturated fatty acids," appearing in the March 1947 issue of the Journal of the American Oil Chemists' Society. The amount employed is calculated on the basis of the analytically determined acid number. Such dimers may contain traces of residual conjugated unsaturation but, for the purposes of this invention, may be considered to be essentially free of such unsaturation.

The above reactants were heated together in the presence of 525 parts by weight of xylol in a reaction vessel under a nitrogen atmosphere and with continuous stirring, the resulting vapors being continuously condensed, the xylol returned to the reaction vessel, and the water removed as formed. Portions of the xylol were later removed periodically to allow the temperature slowly to increase to the desired point. The batch was heated for 8 hours from 140 to 180° C., 8 hours from 185 to 200° C., and 2 hours at 200° C. The product was cooled, and isopropanol and xylol were added to a solids content of 61% as determined by weighing the residue from a weighed sample heated to constant weight in an oven at 100° C. The resulting clear solution had a Gardner-Holdt viscosity of Z to Z–1. The approximate ratio of isopropanol to xylol in the solution was 2:1. The acid number of the resin was 11.3.

To a portion of the solution was added 3% by weight, based on the solids content, of a soluble heat-reactive melamine-formaldehyde resin, 0.06% of phthalic anhydride, and 0.05% of a methylene-bis-phenol antioxidant. The mixture was formed into a thin film, dried, and heated at 100° C. for two hours. A section of the resulting cured film was tested at 25° C. in a Scott Inclined Plane Serigraph, the time required to obtain 10% elongation being approximately 1–4 seconds. The film showed a tensile strength of 152 lbs./sq. in. at 785% elongation, and a modulus of 51 lbs./sq. in. at 100% elongation. It was insoluble in isopropanol:xylol mixtures.

A portion of the solution employed in making the test film was applied to a porous saturating-paper as a saturant, and the impregnated paper dried and heated for 2 hours at 100° C. The treated paper was coated with a pressure-sensitive tape adhesive of the rubber-resin type and was tested as a masking tape in the protection of lacquered panels from further applications of colored lacquer. After over-spraying and drying, the coated tape could be peeled back and stripped from the panel without delamination. There was no penetration of the colored lacquer through the tape.

Example 2

| | Mols |
|---|---|
| Phenyldiethanoamine | 1.65 |
| Polyethylene glycol | 2.02 |
| Monoethanolamine | 1.33 |
| Sebacic acid | 4.55 |
| Maleic anhydride | 0.45 |

The reactants were heated together, in the presence of xylol as in Example 1, for 8 hours at 142–187° C. and 8 hours at 187–200° C. The acid number of the polymer was 17.4, and the solution in isopropanol:xylol at 60% solids had a Gardner-Holdt viscosity of about Z.

A film cast from a portion of the solution to which had been added 14% by weight of an alcohol-soluble, heat-reactive phenol-formaldehyde resin and 0.057% of oxalic acid was dried and then cured by heating for 3 hours at 115° C. followed by 1 hour at 130° C. The thin test film had a tensile strength of 107 lbs./sq. in. at 555% elongation, and a modulus of 41 lbs./sq. in. at 100% elongation.

Another portion of the solution was cured with a small proportion of melamine-formaldehyde resin as in Example 1. The cured film showed the unexpectedly low brittle point of −35° C. as measured on a Gehman Flex instrument. A masking tape backing produced, by the method indicated in Example 1, from such a solution was flexible at low temperatures and was solvent-resistant and delamination-resistant.

A portion of the uncured polymer was recovered from solution and was re-dissolved in isopropanol and acetic acid. It was then coupled with diazotized para-nitroaniline hydrochloride in solution in isopropanol and water made acid to Congo red paper. The color immediately became a very deep red, indicating the formation of a diazo dye from the amide-ester polymer.

Example 3

|  | Mols |
|---|---|
| Phenyldiethanolamine | 5 |
| Monoethanolamine | 5 |
| Sebacic acid | 4.56 |
| Adipic acid | 4.54 |
| Maleic anhydride | 0.9 |

The reactants were heated in xylol, as in the previous examples, for 5 hours at 145–163° C., 4 hours at 163–185° C., and 5 hours at 195–204° C. The product had an acid number of 14.3. The viscosity at 60% solids in isopropanol:xylol was Z–2 (Gardner-Holdt).

After the addition of 4% of soluble heat-reactive melamine-formaldehyde resin and 0.12% oxalic acid, a dried film of the mixture, cured for 2 hours at 100° C. had a tensile strength of 107 lbs./sq. in. at 450% elongation and a modulus of 50 lbs./sq. in. at 100% elongation. Masking tape made with a paper backing which had been impregnated with such a solution and cured was highly resistant to lacquer penetration and to delamination.

Example 4

|  | Mols |
|---|---|
| Phenyldiethanolamine | .7 |
| Monoethanolamine | 3 |
| Adipic acid | 9.1 |
| Maleic anhydride | 0.9 |

The mixture in xylol was heated for 6 hours at 142–200° C. and 2½ hours at 200–205° C., with elimination of water, to produce a polymer having an acid number of 9.9 and a viscosity of Z–4, Gardner-Holdt, at 60% solids in isopropanol:xylol.

Addition of 4% of soluble heat-reactive melamine-formaldehyde resin and 0.15% of oxalic acid, and curing in film form at 100° C. for 2 hours, produced a thin cured film having a tensile strength of 138 lbs./sq. in. at 500% elongation and a modulus of 62 lbs./sq. in. at 100% elongation. The same solution was effective as an impregnant for saturating paper in making a lacquer-resistant unified backing for masking tape.

Example 5

|  | Mols |
|---|---|
| Phenyldiethanolamine | 5 |
| Monoethanolamine | 5 |
| Sebacic acid | 9.1 |
| Maleic anhydride | 0.9 |

Heating the reactants in xylol for 3½ hours at 138–170° C., 3¼ hours at 170–200° C., and 3 hours at 200–205° C. produced a polymer having an acid number of 12.6. The amount of water removed during the reaction was 97.5% of theoretical. Diluting with isopropanol to a solids content of 60% gave a solution slightly more viscous than Z–3 on the Gardner-Holdt scale.

Cured by heating for 2 hours at 250° C. in a thin film with 4% of soluble heat-reactive melamine-formaldehyde resin and 0.02% of oxalic acid, the polymer had a tensile strength of 172 lbs./sq. in. at 400% elongation and a modulus of 107 lbs./sq. in. at 100% elongation. The cured polymer was effective in providing lacquer resistance delamination resistance in impregnated paper masking tape backings.

Similar results were obtained when m-tolyldiethanolamine, or a mixture of o-tolyl ethanolamine and o-tolyldiethanolamine having an average molecular weight of 162, was substituted for the phenyldiethanolamine. In each of these and other equivalent N-aryl dialkanolamines, the aryl group will be seen to have at least one active hydrogen atom, i. e., it contains at least one hydrogen atom in a position either ortho or para, and preferably para, to the position of the nitrogen atom, and furthermore contains no other substituent groups which would deactivate such active hydrogen atom.

Example 6

|  | Mols |
|---|---|
| Phenyldiethanolamine | 1 |
| Diglycolic acid | 1 |

The components were heated in xylol with elimination of water and gradual reduction in solvent concentration for about 8 hours to a maximum temperature of 158° C. The resulting polymer was cured to a flexible rubbery or leathery film by heating for 1½ hours at 125° C. with 2–4% of soluble heat-reactive melamine-formaldehyde resin as the curing agent and about 0.1% oxalic acid as catalyst. Increasing the amount of curing agent to 6% resulted in a stiff polymer. With less than about 2% of curing agent, adequate cure was not obtained and the product remained soft and soluble. Substitution of sebacic acid or of dimerized linoleic acid for part or all of the diglycolic acid improved the ruberiness of the cured polymer.

A portion of the polymer prepared from equimolar amounts of phenyldiethanolamine and sebacic acid was warmed for a few minutes with a slight excess of methyl iodide, producing a polymeric quaternary ammonium salt derivative which was found to be extremely readily emulsifiable in water.

Example 7

|  | Mols |
|---|---|
| Phenyldiethanolamine | 4 |
| Dimerized linoleic acid | 2 |
| Succinic acid | 1.64 |
| Maleic anhydride | 0.36 |

Reaction was carried out as in the previous examples, to an acid number of 8, at which point a 62% solution of the polymer in equal volumes of xylol and isopropanol had a Gardner-Holdt viscosity of U. A cast film of the polymer containing 6% of soluble heat-reactive melamine-formaldehyde resin cured in 1¼ hours at 125° C. to an extremely supple pale colored elastic film.

Example 8

|  | Mols |
|---|---|
| Phenyldiethanolamine | 2 |
| Phenylethanolamine | 2 |
| Dimerized linoleic acid | 1 |
| Diglycolic acid | 2.64 |
| Maleic anhydride | 0.36 |

After about seven hours' refluxing with xylol as in the previous examples, the temperature reached 197° C. and the polymer had an acid number of 17. It was soluble at 60% solids in a 2:1 mixture of xylene and isopropanol. Addition of 4% of soluble heat-reactive melamine-formaldehyde resin and heating for 2 hours at 115° C., in the form of thin cast films 0.015 inch thick, produced strong self-supporting cured films having a tensile strength of 236 lbs./sq. in. at 43% elongation and a modulus of 140 lbs./sq. in. at 100% elongation.

Example 9

|  | Mols |
|---|---|
| Phenyldiethanolamine | 2.1 |
| Monoethanolamine | 2.9 |
| Sebacic acid | 4.55 |
| Maleic anhydride | 0.45 |

Reaction in xylol for about six hours, with removal of water, produced a polymer with an acid number of 17. It was soluble in isopropanol:xylol mixture at 50° C., and cured to a tough, firm, solvent-resistant film when heated with 4% of a soluble heat-reactive melamine-formaldehyde resin and 0.12% of oxalic acid.

At temperatures below about 50° C., the polymer solution slowly set to a soft mush or slurry. Solubility is improved by reducing the proportion of monoethanolamine and increasing the proportion of phenyldiethanolamine.

Carrying out the condensation reaction in the presence of a water-immiscible solvent such as xylol, as illustrated in the examples, affords close control of the progress of the reaction and in general is a highly effective and desirable procedure. Equally good results may be obtained, however, by cooking the reactants together in the absence of such solvent, although preferably under an inert atmosphere. The resulting resin is a sticky, stringy liquid at the final reaction temperature, and is somewhat less conveniently soluble than when produced in the presence of xylol as described in the examples.

As indicated in the examples, my novel soluble nitrogen-containing polyester polymers are readily cured to a solvent-resistant state by heating with small amounts of soluble heat-reactive melamine-formaldehyde resin. A typical resin of this type is "Melmac 248-8," a resinous heat-reactive or heat-advancing condensation product of melamine, formaldehyde and butanol, available as a solution in a mixture of butanol and xylol. Other equivalent soluble heat-advancing aminoaldehyde resins are equally effective as curing agents for these polymers; "Uformite F-200-E," a soluble heat-reactive condensation product of urea, formaledhyde and butanol, is one such material. Aldehydes such as paraformaldehyde, adipaldehyde, alpha-hydroxyadipaldehyde, and glyoxal are effective but tend to produce cured films having lower modulus values than those cured with the more complex resinous amino-aldehyde condensates. Phenol-aldehyde condensates are reactive with the polymers, e. g. as shown in Example 1, but are normally required in very much larger amounts than the amino-aldehydes in order to provide an equivalent degree of cure.

The action of these curing agents in converting my low molecular weight, soluble polymers to the higher molecular weight, insoluble state is speeded up by the catalytic action of a small amount of acidic material. As indicated in the examples, oxalic and phthalic acids are effective catalysts; salicylic, lactic, maleic and citric aids are also useful.

The particular reactants and the relative proportions and manner of combining of these reactants, as well as the particular kind and amount of curing agent, determines the properties of the cured film. By proper control of these several factors, as illustrated in the specific examples, there may be obtained compositions which are eminently suited for the impregnation of paper and the preparation of solvent-resistant and delamination-resistant masking tape backings. I have found that compositions which produce thin cured films having a modulus of about 30–160 lbs./sq. in. at 100% elongation, and having a tensile strength of at least about 70 lbs./sq. in. at an elongation of at least about 300%, may readily be provided and are particularly valuable in the preparation of such flexible sheet material. Coated with a firmly adherently bonded layer of presusre-sensitive tape adhesive, these unified fibrous webs provide masking tapes which are flexible under wide ranges of temperature and conform to curved surfaces, are highly resistant to weathering under high humidity and direct sunlight, are highly resistant to penetration by solvents or colored lacquers, and can be stripped from surfaces to which adhesively applied without delaminating.

Surprisingly, the presence of the tertiary amino nitrogen atom in the polymer, resulting from the inclusion of the phenyldiethanolamine or equivalent, does not result in undue water sensitivity and premature deterioration of the polymer. The cured film and the cured impregnated backing are both highly water-resistant and weather-resistant.

Certain precautions to be observed in obtaining the desired resinous products of this invention may be mentioned. When a considerable proportion of the dicarboxylic acid component is chosen from acids such as diglycolic or glutaric acid, which readily form cyclic imides, then alkanolamines having primary amino groups should be excluded or at least greatly restricted, since the formation from such reactants of a cyclic imide prevents the desired growth of the polymer chain. Linear components, and components providing a higher frequency of polar groups in the polymer chain, tend to produce stiffer and less stretchy cured films. Greater elasticity and softness is obtained by selecting components having side chains or radicals, or a low incidence of polar groups. The same effect is generally obtained by any of several known compositional or procedural devices which destroy the symmetry of the polymer chain.

The properties of the cured films, and hence also of impregnated or treated sheet material carrying the cured polymeric resinous product, are also dependent on the amount of aldehydic curing agent employed as well as the nature of the specific curing agent. Increased amounts of curing or cross-linking agent will tend to produce greater stiffness and solvent resistance with a given polymer composition. As indicated earlier, dialdehydes such as glyoxal tend to produce a cured product having lower modulus than is obtained by use of a more complex agent of higher functionality such as a soluble heat-reactive melamine-formaldehyde condensate having a multiplicity of active methylol or methylol ether groups on a relatively rigid molecular skeleton. Since phenol-formaldehyde condensates are frequently more readily compatible with the polymers than are the polyaldehydes or the amino-aldehyde condensates, these curing agents may be incorporated in quite large proportions, e. g. up to 50% or even higher in many cases, where such modification is desired. Due to the solubility of the polymers, such incorporation is readily accomplished in solution and without any necessity for the milling or heavy-duty mixing procedures ordinarily required.

In certain of the specific examples hereinbefore set forth, primary alkanolamines are employed in conjunction with the N-aryl dialkanolamines. In such cases, the use of a short-chain linear monoalkanolamine, such as monoethanolamine, in amounts greater than about one-half of the total non-acidic reactants, tends to reduce the solubility of the resulting polymer, as evidenced in Example 9. Substitution of a branched-chain primary alkanolamine, e. g. monoisopropanolamine or 2-amino-1-butanol, for the monoethanolamine on the other hand tends to improve slightly the solubility of the polymeric product. Alkanolamines having a primary amino group attached to a tertiary carbon atom are less useful, for the purposes of my invention, than those in which the primary amino group is attached to a non-tertiary, i. e. a primary or secondary, carbon atom.

It will be apparent from the several examples that the molar quantities of acidic reactants and of hydroxyl- or non-tertiary-amino-containing reactants are in each case substantially equivalent, i. e. that the number of reactive carboxyl groups available is substantially the same as the number of reactive hydroxyl and amino groups. Within these limitations, additional substitutions may be made. For example, up to about one-fifth of the total mol equivalents of alkanolamines may be replaced by unsymmetrical diamines such as 1,3-diaminobutane, or somewhat less in the case of ethylene diamine, without unduly diminishing the solubility or otherwise deleteriously affecting the properties of my novel polymeric products. Maleic acid, included in many of the specific examples, is surprisingly found to provide enhanced solubility of the polymer at room temperatures and accordingly is preferred; but this unsaturated dicarboxylic acid may be replaced by saturated acids with no loss of curability by aldehydic curing agents.

As previously stated, my novel polymers are soluble in readily available volatile organic solvents and form concentrated solutions of low viscosity which are particularly suitable for impregnating paper. They are efficiently and economically produced by a single-step process involving the heating together of all reactants simultaneously. They are reactive with aldehydes, such as formaldehyde, or with aldehyde derivatives containing a plurality of active methylol groups, such as heat-reactive amino-aldehyde or phenol-aldehyde resins, whereby they are cured to a solvent-resistant, weather-resistant, strong, tough and flexible state. They are film-forming, and adhere strongly to paper fibers and the like. The polymers may or may not contain activated olefinic linkages, and in any event are not susceptible of curing by means of customary small amounts of peroxide-type catalysts, since in every instance the novel and useful properties obtained are dependent on the incorporation of significant amounts of one or more N-aryl dialkanolamines as previously defined herein, and of which phenyldiethanolamine is an outstandingly effective example. The presence of such reactant or reactants makes possible combinations such as are illustrated by Examples 1, 6 and 8, wherein diglycolic acid, a desirable low-cost raw material, is combined with the aminoalchol and other reactants to form a soluble, readily curable polymer.

*Example 10*

|  | Mol |
|---|---|
| Phenyldiethanolamine | 1.0 |
| Succinic acid | .91 |
| Maleic anhydride | .09 |

The components were reacted in xylol, as previously described, to an acid number of 10 and a Gardner-Holdt viscosity of V–W at 62% concentration. When cured for 1½ hours at 125° C. with 2–6% "Melmac 248–8" melamine-formaldehyde resin, rubbery films were produced which showed elastic elastic and tensile properties in the range desired for use as impregnants in the preparation of unified fibrous backings for pressure-sensitive adhesive tape.

The N-aryl dialkanolamine included in each of the examples provides potentially reactive sites for cross-linking by means of the aldehydic curing agents, and sufficient of this component must be present to provide in the polymer at least one

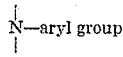

for each 100 atoms in the polymer chain connecting such groups if an alkanolamine bearing a primary amino group is included, or for each 50 atoms in the chain in the absence of such alkanolamine. In addition to the N-aryl dialkanolamine in the proportion indicated, there may be included non-cyclizable non-N-substituted monoalkanolamines (alkanolamines having a primary amino group) and N-hydrocarbon-substituted monoalkanolamines, such as N-phenylmonoethanolamine, N-butyl monopropanolamine, N-benzyl monoethanolamine, N-cyclohexylethanolamine, as well as nitrogen-free dihydroxy compounds, i. e., glycols. The total of reactive amino and hydroxyl groups contained in such components must be substantially the same as the total of reactive carboxyl groups contained in the acidic components. Of these acidic components, at least about four-fifths, on a molar basis, must be dicarboxylic acids containing at least four carbon atoms in the skeletal chain, and containing essentially no conjugated unsaturation. Up to about one-fifth of the total mols of dicarboxylic acids may consist of an unsaturated acid such as maleic, fumaric, itaconic or citroconic acid or anhydride, or the adduct of maleic anhydride with a conjugated diene, e. g. butadiene or cyclopentadiene.

What I claim is as follows:

1. The method of producing a nitrogen-containing polyester polymer, readily soluble in isopropanol-xylol and capable of cross-linking or curing, when heated in thin film form in admixture with a small proportion of an aldehydic curing agent, to a solvent-resistant, tough and flexible film having a modulus at 100% elongation of about 30–160 lbs./sq. in. and a tensile strength of at least about 70 lbs./sq. in. at an elongation of at least about 300%; which comprises simultaneously mixing together substantially equimolar amounts of interreactive components as hereinafter defined, and heating the mixture, with elimination of water of condensation, until a low-acid-number soluble polymer is obtained; said interreactive components consisting essentially of (a) dicarboxylic acids including about 80% to about 91% of dicarboxylic acid having at least four carbon atoms in the skeletal chain, having the carboxyl groups attached to separate aliphatic carbon atoms, and having essentially no conjugated unsaturation, and correspondingly about 9% to about 20% of dicarboxylic acid selected from the class consisting of maleic, fumaric, itaconic, and citraconic acids, and adducts of maleic anhydride with conjugated dienes; (b) compounds reactive with said acids and selected from the class consisting of phenyldiethanolamine, noncyclizable monoalkanolamines having a single primary amino group, noncyclizable N-mono-hydrocarbon-substituted monoalkanolamines having a single secondary amino group, glycols, and mixtures thereof, and including phenylidiethanolamine in an amount sufficient to average at least one

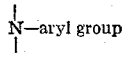

for each 100 atoms in the polymer chain connecting such groups; the relative amounts of said components being subject to the further conditions that (1) where the amount of phenyldiethanolamine is insufficient to average at least one

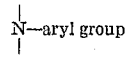

for each 50 atoms in the polymer chain connecting such groups, then the (b) compounds must include at least a small proportion of said noncyclizable monoalkanolamine having a single primary amino group; and (2) where the dicarboxylic acid components include a considerable proportion of acids capable of readily forming cyclic imides, then said noncyclizable monoalkanolamine having a single primary amino group must be substantially excluded.

2. A nitrogen-containing polyester polymer, soluble in isopropanol-xylol and capable of cross-linking or curing, when heated in thin film form in admixture with a small proportion of an aldehydic curing agent, to a solvent-resistant, tough and flexible film having a modulus at 100% elongation of about 30–160 lbs./sq. in., and a tensile strength of at least about 70 lbs./sq. in. at an elongation of at least about 300%; said polymer being the product of simultaneously mixing together substantially equimolar amounts of inter-reactive components as hereinafter defined, and heating the mixture, with elimination of water of condensation, until a low-acid-number soluble polymer is obtained; said inter-reactive components consisting essentially of (a) dicarboxylic acids including about 80% to about 91% of dicarboxylic acid having at least four carbon atoms in the skeletal chain, having the carboxyl groups attached to separate aliphatic carbon atoms, and having essentially no conjugated unsaturation, and correspondingly about 9% to about 20% of dicarboxylic acid selected from the class consisting of maleic, fumaric, itaconic, and citraconic acids, and adducts of maleic anhydride with conjugated dienes; and (b) compounds reactive with said acids and selected from the class consisting of phenyldiethanolamine, noncyclizable monoalkanolamines having a single primary amino group, noncyclizable N-mono-hydrocarbon-substituted monoalkanolamines having a single secondary amino group, glycols, and mixtures thereof, and including phenyldiethanolamine in an amount sufficient to average at least one

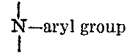

for each 100 atoms in the polymer chain connecting such groups; the relative amounts of said components being subject to the further conditions that (1) where the amount of phenyldiethanolamine is insufficient to average at least one

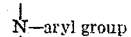

for each 50 atoms in the polymer chain connecting such groups, then the (b) compounds must include at least a small proportion of said noncyclizable monoalkanolamine having a single primary amino group; and (2) where the dicarboxylic acid components include a considerable portion of acids capable of readily forming cyclic imides, then said noncyclizable monoalkanolamine having a single primary amino group must be substantially excluded.

3. A solvent-resistant, tough and flexible polymeric product produced by heating together a small proportion of an aldehydic curing agent with a preponderant proportion of a polyester polymer, said polymer being the product of simultaneously mixing together substantially equimolar amounts of inter-reactive components as hereinafter defined, and heating the mixture, with elimination of water of condensation, until a low-acid-number polymer soluble in isopropanol-xylol is obtained; said inter-reactive components consisting essentially of (a) dicarboxylic acids including at least about 80% of dicarboxylic acid having at least four carbon atoms in the skeletal chain, having the carboxyl groups attached to separate aliphatic carbon atoms, and having essentially no conjugated unsaturation, and not more than about 20% of dicarboxylic acid selected from the class consisting of maleic, fumaric, itaconic, and citraconic acids, and adducts of maleic anhydride with conjugated dienes; and (b) compounds reactive with said acids and selected from the class consisting of phenyldiethanolamine, noncyclizable monoalkanolamines having a single primary amino group, noncyclizable N-mono-hydrocarbon-substituted monoalkanolamines having a single secondary amino group, glycols, and mixtures thereof, and including phenyldiethanolamine in an amount sufficient to average at least one $$\underset{|}{\overset{|}{N}}\text{—aryl group}$$

for each 100 atoms in the polymer chain connecting such groups; the relative amounts of said components being subject to the further conditions that (1) where the amount of phenyldiethanolamine is insufficient to average at least one $$\underset{|}{\overset{|}{N}}\text{—aryl group}$$

for each 50 atoms in the polymer chain connecting such groups, then the (b) compounds must include at least a small proportion of said noncyclizable monoalkanolamine having a single primary amino group, and (2) where the dicarboxylic acid components include a considerable portion of acids capable of readily forming cyclic imides, then said noncyclizable monoalkanolamine having a single primary amino group must be substantially excluded.

References Cited in the file of this patent

UNITED STATES PATENTS

| | | |
|---|---|---|
| 2,132,442 | Rothrock | Oct. 11, 1938 |
| 2,281,415 | Coffman | Apr. 28, 1942 |
| 2,341,735 | Monsaroff | Feb. 15, 1944 |
| 2,394,010 | Quarles | Feb. 5, 1946 |

FOREIGN PATENTS

| | | |
|---|---|---|
| 572,671 | Great Britain | Oct. 18, 1945 |